US009373918B2

(12) United States Patent
Kawai et al.

(10) Patent No.: US 9,373,918 B2
(45) Date of Patent: Jun. 21, 2016

(54) CONNECTOR

(71) Applicant: YAZAKI CORPORATION, Tokyo (JP)

(72) Inventors: Ryuji Kawai, Shizuoka (JP); Hirotaka Fukushima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/757,552

(22) Filed: Dec. 24, 2015

(65) Prior Publication Data

US 2016/0126681 A1 May 5, 2016

Related U.S. Application Data

(63) Continuation of application No. PCT/JP2014/066513, filed on Jun. 23, 2014.

(30) Foreign Application Priority Data

Jun. 26, 2013 (JP) .................................. 2013-133332

(51) Int. Cl.
H01R 13/66 (2006.01)
(52) U.S. Cl.
CPC .................................. *H01R 13/6683* (2013.01)
(58) Field of Classification Search
CPC ............................ H01R 13/6683; H01R 13/04
See application file for complete search history.

(56) References Cited

U.S. PATENT DOCUMENTS 5,038,752 A * 8/1991 Anson ............... A47J 27/21066
338/23
2014/0364014 A1* 12/2014 Kawamoto ........... H01R 13/424
439/692

FOREIGN PATENT DOCUMENTS

| JP | 3-44637 U    | 4/1991  |
| JP | 6-29044 U    | 4/1994  |
| JP | 2002-352635 A | 12/2002 |
| JP | 2008-21622 A | 1/2008  |

OTHER PUBLICATIONS

International Search Report of PCT/JP2014/066513, dated Sep. 9, 2014. [PCT/ISA/210].
Written Opinion of PCT/JP2014/066513, dated Sep. 9, 2014. [PCT/ISA/237].

* cited by examiner

*Primary Examiner* — Briggitte R Hammond
(74) *Attorney, Agent, or Firm* — Sughrue Mion, PLLC

(57) ABSTRACT

This connector (1) includes a connector housing (59) and a holder (4) which supports electric wires (17) connected to terminals (39) accommodated in the connector housing. The holder includes a first holder (5) which has a locking portion (9) and a thermistor accommodation portion (13) accommodating a thermistor (11); and a second holder (7) which is provided with a locked portion (15) locked by the locking portion, and with an electric wire accommodation portion (19) that accommodates the electric wires. Through locking of the locked portion by the locking portion, the thermistor and the electric wires overlapped and mounted on the thermistor are nipped between the thermistor accommodation portion and the electric wire accommodation portion by the second holder (7).

4 Claims, 5 Drawing Sheets

CONNECTOR

CROSS REFERENCE TO RELATED APPLICATIONS

This application is a Continuation of PCT Application No. PCT/JP2014/066513, filed on Jun. 23, 2014, and claims the priority of Japanese Patent Application No. 2013-133332, filed on Jun. 26, 2013, the content of both of which is incorporated herein by reference.

BACKGROUND

1. Technical Field

The present invention relates to a connector, and particularly relates to a connector in which a thermistor and an electric wire are sandwiched and fixed by a main rear holder and a sub-rear holder.

2. Related Art

Conventionally, a thermistor fixing structure (connector) 301 as shown in FIG. 1 is known (refer to JP 2002-352635 A).

In the thermistor fixing structure 301, a thermistor 307 is installed in terminals 305 by using an insulating heat conduction material 303. Temperatures of the terminals 305 are measured by the thermistor 307.

SUMMARY OF THE INVENTION

However, in the conventional thermistor fixing structure 301, although the temperatures of the metal terminals 305 can be measured, the thermistor 307 and an electric wire (electric wires extending out from the terminals 305) 309 are separated. Thus, there is a problem that a temperature rise of the electric wire 309 due to overcurrent conduction during electric charging or the like cannot surely be measured.

The present invention is achieved in consideration with the above problem, and an object thereof is to provide a connector capable of easily and surely measuring a temperature of an electric wire by closely attaching and fixing a thermistor and the electric wire by a first holder and a second holder.

A connector according to the present invention includes a connector housing and a holder assembled to the connector housing, the holder supporting an electric wire connected to a terminal which is accommodated in the connector housing. The holder includes a first holder including a locking portion and a thermistor accommodation portion which accommodates a thermistor, and a second holder including a locked portion to be locked to the locking portion and an electric wire accommodation portion which accommodates the electric wire, and in the holder, the thermistor and the electric wire overlapped and mounted on the thermistor are nipped between the thermistor accommodation portion and the electric wire accommodation portion by locking the locked portion to the locking portion.

The thermistor accommodation portion of the connector according to the present invention may include a bottom wall on which the thermistor is mounted, and a side wall standing from the bottom wall along the thermistor, and may further include a projection portion projecting toward the thermistor from the side wall.

The first holder of the connector according to the present invention may include a main body portion continuing to the thermistor accommodation portion, the main body portion in which a means to be coupled to the connector housing is provided, and may further include a recessed portion into which the electric wire is insertable in the direction along the side wall in the main body portion.

The electric wire accommodation portion of the connector according to the present invention may include a pressing projection to be brought into contact with the electric wire to press the electric wire when the thermistor and the electric wire are sandwiched between the electric wire accommodation portion and the thermistor accommodation portion.

According to the present invention, an effect of providing the connector capable of easily and surely measuring the temperature of the electric wire by closely attaching and fixing the thermistor and the electric wire by the first holder and the second holder is exerted.

DETAILED DESCRIPTION

An embodiment of the present invention is described in detail with reference to drawings.

In this specification, it must be noted that drawings are schematic views, and constitutions of devices and systems are different from constitutions of an actual device. Accordingly, the specific constitutions should be determined by taking into account the description made hereinafter. Further, it is also needless to say that the respective drawings include portions having different constitutions.

The embodiment of the present invention described hereinafter is provided for exemplifying a device and a method which embody the technical concept of the present invention, and the technical concept of the present invention does not limit materials, shapes, structures, arrangements and the like of the respective constitutional parts to the followings. Various modifications are conceivable with respect to the technical concept of the present invention within the technical scope described in claims.

Figure 7:
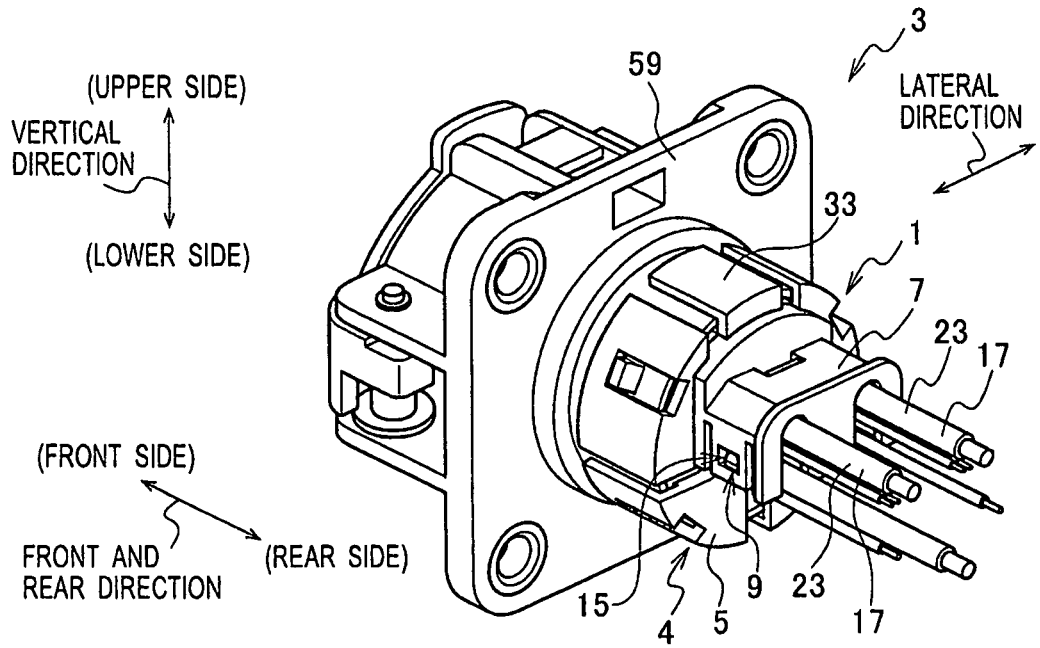
FIG. 7 is a perspective view showing a state where the members shown in FIG. 5 are installed in the connector housing, the view showing the connector.

As shown in FIG. 7 and the like, a connector 1 according to the embodiment of the present invention is used for, for example, a charging connector device 3. The charging connector device 3 is mounted on and used in an electric vehicle or the like, and connected to a charging connector on the side of a charging stand, so that the electric vehicle or the like is charged.

It should be noted that hereinafter, for convenience of description, predetermined three directions in a space are sometimes called as the front and rear direction, the lateral direction, and the vertical direction. The front and rear direction, the lateral direction, and the vertical direction are orthogonal to each other.

As shown in FIGS. 2 to 7, the connector 1 is formed to include a connector housing 59 and a holder 4. The holder 4 is assembled to the connector housing 59 and supports electric wires 17 connected to terminals 39 which are accommodated in the connector housing 59.

The holder 4 is formed to include a first holder (such as a main rear holder) 5 and a second holder (such as a sub-rear holder) 7.

The main rear holder 5 is formed to include locking portions 9 and thermistor engagement portions (thermistor installment portions in which thermistors are installed; thermistor accommodation portions in which the thermistors are accommodated) 13 with which thermistors 11 are engaged.

The sub-rear holder 7 is formed to include locked portions 15 and electric wire engagement portions (electric wire holding portions that hold electric wires; electric wire accommodation portions in which the electric wires are accommodated) 19 with which electric wires 17 are engaged.

By locking the locked portions 15 of the sub-rear holder 7 to the locking portions 9 of the main rear holder 5 (by engaging the locked portions 15 with the locking portions 9), the sub-rear holder 7 is integrally installed in the main rear holder 5.

In a state where the sub-rear holder 7 is installed in the main rear holder 5, the thermistors 11 and the electric wires (electric wires overlapped and mounted on the thermistors 11) 17 overlapped on the thermistors 11 are sandwiched (nipped) by the thermistor engagement portions 13 and the electric wire engagement portions 19 with predetermined force. The thermistors 11 and the electric wires 17 are fixed to the main rear holder 5 and the sub-rear holder 7. Since the thermistors 11 and the electric wires 17 are sandwiched, contact portions 21 between the thermistors 11 and the electric wires 17 are formed in a planar shape, and surface pressure in the longitudinal direction of the electric wires 17 is for example uniform.

The thermistor engagement portions 13 of the main rear holder 5 and the electric wire engagement portions 19 of the sub-rear holder 7 are elongated in the front and rear direction.

In a state where the sub-rear holder 7 is installed in the main rear holder 5 and the thermistors 11 and the electric wires 17 are sandwiched by the thermistor engagement portions 13 and the electric wire engagement portions 19, the electric wire engagement portions 19 are placed on the upper side and the thermistor engagement portions 13 are placed on the lower side. The thermistor engagement portions 13 and the thermistors 11 are in contact with each other, the electric wire engagement portions 19 and the electric wires 17 are in contact with each other, and the longitudinal direction of the thermistors 11 and the longitudinal direction of the electric wires 17 are the front and rear direction and match with each other. The direction in which the thermistors 11 and the electric wires 17 are sandwiched is the vertical direction as already understood. The thermistors 11 are placed on the lower side and the electric wires 17 are placed on the upper side.

In each of the electric wires 17, a sheath (cover) 23 or the like is (elastically) deformed. In a state where the thermistor 11 and the electric wire 17 are sandwiched by the thermistor engagement portion 13 and the electric wire engagement portion 19, the thermistor 11 and the electric wire 17 are closely attached to each other, and this closely attached portion (contact portion) 21 is formed in an elongated rectangular planar shape. The longitudinal direction is the front and rear direction, and the width direction is the lateral direction.

Further description will be given. Each of the thermistors 11 is formed in an elongated square pole shape having such rigidity that the thermistor can be regarded as a substantially-rigid body. Each of the electric wires 17 is formed in an elongated columnar shape.

When the thermistor 11 is installed in the thermistor engagement portion 13 of the main rear holder 5 and the sub-rear holder 7 is installed in the main rear holder 5 without installing the electric wire 17, size (size in the vertical direction) between the thermistor 11 and the electric wire engagement portion 19 is slightly smaller than an outer diameter of the electric wire 17.

In a state where the thermistor 11 and the electric wire 17 are sandwiched by the thermistor engagement portion 13 and the electric wire engagement portion 19, the columnar shape electric wire 17 is elastically deformed by sandwiching pressure, and the contact portion 21 between the thermistor 11 and the electric wire 17 is formed in an elongated rectangular planar shape. The surface pressure of the contact portion 21 between the thermistor 11 and the electric wire 17 is small in both ends in the lateral direction, gradually larger toward a center part, and the largest in the center. Meanwhile, the surface pressure of the contact portion 21 between the thermistor 11 and the electric wire 17 is substantially fixed in the front and rear direction. That is, in any point of the contact portion 21 between the thermistor 11 and the electric wire 17, distribution of the surface pressure in the lateral direction is the same.

Figure 9:
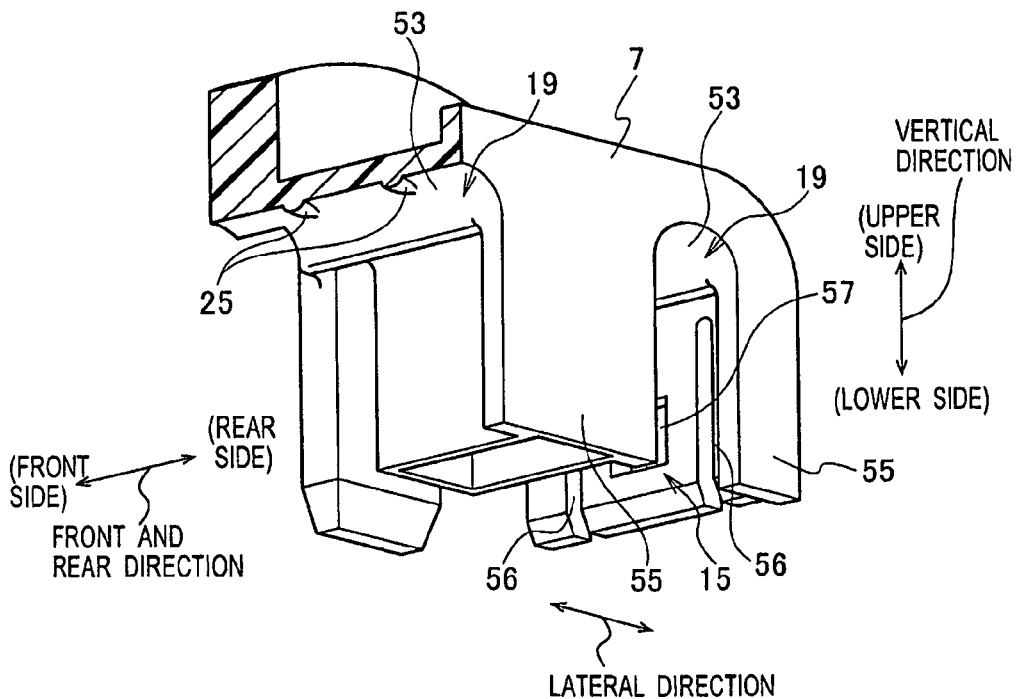
FIG. 9 is an enlarged perspective view showing an electric wire engagement portion of the sub-rear holder of the connector according to the embodiment of the present invention.

As shown in FIG. 9, projections 25 are provided in each of the electric wire engagement portions 19 of the sub-rear holder 7. The projections 25 are brought into contact with the electric wire 17 and press the electric wire 17 when the thermistor 11 and the electric wire 17 are sandwiched by the thermistor engagement portion 13 and the electric wire engagement portion 19.

The electric wire engagement portion 19 is directed downward, and the projections (pressing projections) 25 of the electric wire engagement portion 19 project downward. The plurality of (for example, two) projections 25 is provided. One of the projections is provided in one end in the longitudinal direction (front and rear direction) of the electric wire engagement portion 19 (in the vicinity of a front end), and the other projection is provided in the other end in the longitudinal direction (front and rear direction) of the electric wire engagement portion 19 (in the vicinity of a rear end).

In a state where the thermistor 11 and the electric wire 17 are sandwiched by the thermistor engagement portion 13 and the electric wire engagement portion 19, mainly the projections 25 of the electric wire engagement portion 19 are brought into contact with the electric wire 17 and press the electric wire 17.

Further description will be given. In a state where the thermistor 11 and the electric wire 17 are sandwiched by the thermistor engagement portion 13 and the electric wire engagement portion 19, the projections 25 of the electric wire engagement portion 19 are brought into contact with the electric wire 17 and press the electric wire 17 downward. Although a part of the electric wire engagement portion 19 other than the projections 25 is in contact with the electric wire 17, the part presses the electric wire 17 downward with force smaller than that of the projections 25. It should be noted that due to press by the projections 25 of the electric wire engagement portion 19, parts of the electric wire 17 at the projections 25 are more largely deformed, and other parts of the electric wire 17 not at the projections 25 are slightly deformed or hardly deformed.

Since the projections 25 are provided in the electric wire engagement portion 19, force of pressing the electric wire 17 by the electric wire engagement portion 19 (pressure in a portion where the electric wire engagement portion 19 and the electric wire 17 are engaged) is different through the longitudinal direction of the electric wire 17. On the opposite side, the surface pressure of the planar contact portion 21 between the thermistor 11 and the electric wire 17 is extremely slightly increased at the projections 25 of the electric wire engagement portion 19 and substantially uniform through the longitudinal direction of the electric wire 17.

It should be noted that in a state where the thermistor 11 and the electric wire 17 are sandwiched by the thermistor engagement portion 13 and the electric wire engagement portion 19, only the projections 25 of the electric wire engagement portion 19 may be brought into contact with the electric wire 17 and press the electric wire. Instead of or in addition to providing the projections 25 in the electric wire engagement portion 19, the same projections as the projections 25 of the electric wire engagement portion 19 may be provided in a bottom wall surface (bottom wall) 29 of the thermistor engagement portion 13.

Figure 8:
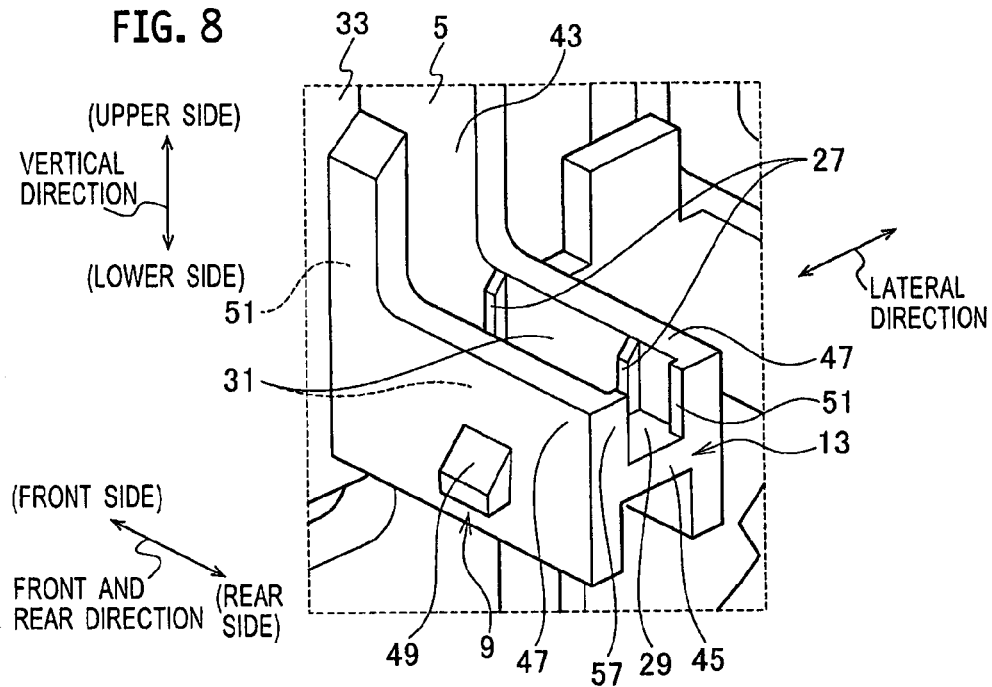
FIG. 8 is an enlarged perspective view showing a thermistor engagement portion of the main rear holder of the connector according to the embodiment of the present invention.

As shown in FIG. 8, thermistor fixing ribs (projection portions) 27 are provided in each of the thermistor engagement portions 13 of the main rear holder 5. The thermistor fixing ribs 27 are to fix for example the thermistor 11 to the thermistor engagement portion 13 when the thermistor 11 is installed in the thermistor engagement portion 13.

The thermistor fixing ribs 27 are to press a side surface (one end surface in the lateral direction) of the thermistor 11 and fix the thermistor 11 to the thermistor engagement portion 13 when the thermistor 11 is installed in the thermistor engagement portion 13.

Further description will be given. The thermistor engagement portion 13 is formed by an elongated square pole shape recessed portion as well as the thermistor 11 and extended long in the front and rear direction, in which one elongated rectangular bottom wall surface 29 and a pair of side wall surfaces (elongated rectangular side wall surfaces; side walls) 31 are formed.

The thermistor fixing ribs 27 slightly project from one of the pair of side wall surfaces 31. The plurality of (for example, two) thermistor fixing ribs 27 is provided. One of the thermistor fixing ribs is provided in one end in the longitudinal direction (front and rear direction) of the thermistor engagement portion 13 (in the vicinity of a front end), and the other thermistor fixing rib is provided in the other end in the longitudinal direction (front and rear direction) of the thermistor engagement portion 13 (in the vicinity of a rear end).

When the thermistor 11 is installed in the thermistor engagement portion 13, front ends of the thermistor fixing ribs 27 are brought into contact with the thermistor 11 and sandwich and fix the thermistor 11.

For example, when the thermistor 11 is installed in the thermistor engagement portion 13, the thermistor fixing ribs 27 are deformed (may be elastically or plastically deformed), and the thermistor 11 is sandwiched by the other side wall surface 31 and the thermistor fixing ribs 27 in the lateral direction with predetermined force and fixed to the thermistor engagement portion 13 even in a state where the sub-rear holder 7 is not yet installed in the main rear holder 5.

As described above, the main rear holder 5 is used for the charging connector device 3 (for the electric vehicle or the like), and the thermistor engagement portions 13 are provided to project rearward from a main body portion 33 of the main rear holder (conventional main rear holder) 5 of the charging connector device 3. The main rear holder 5 is formed by changing a shape of a part of the conventional main rear holder (for example, refer to "http://guide.jsae.or.jp/first_column/6278/" on Jun. 3, 2013) (formed by adding the thermistor engagement portions 13 to the conventional main rear holder).

The connector 1 will be described further in detail.

The thermistors 11 are formed in an elongated square pole shape as described above, and wires (electric wires) 35 are extended rearward from ends (rear ends) in the longitudinal direction.

The electric wires 17 are formed in an elongated columnar shape as described above in a mode where cores are covered with the sheaths 23 for example. The terminals 39 in which insulating portions 37 are provided in leading ends are installed in leading ends (front ends) of the electric wires 17.

The main rear holder 5 is integrally molded with insulating synthetic resin for example, and formed to include the columnar shape main body portion 33, the thermistor engagement portions 13, and terminal installment portions 41.

The main rear holder 5 has the main body portion 33 continuing to the thermistor accommodation portions 13, the main body portion in which a means to be coupled to the connector housing 59 is provided. In the main body portion 33, recessed portions 43 into which the electric wires 17 are insertable in the direction along the side wall surfaces 31, the recessed portions to which the electric wires 17 come in are formed. The recessed portions 43 are recessed toward the center from a side surface of the columnar shape main body portion 33.

Each of the thermistor engagement portions 13 is formed to include a bottom wall portion 45 and a pair of side wall portions 47, and projects rearward from a circular shape rear end surface of the main body portion 33.

A shape of a section (section by a plane orthogonal to the front and rear direction) of the thermistor engagement portion 13 is formed in an "H" shape (may be formed in a channel shape). An upper surface of the bottom wall portion 45 serves as the bottom wall surface (bottom wall) 29, and inner surfaces of the pair of side wall portions 47 serve as the side wall surfaces (side walls) 31.

It should be noted that as already understood, the thermistor accommodation portion 13 has the bottom wall surface 29 on which the thermistor 11 is mounted, and the side wall surfaces 31 standing from the bottom wall surfaces 29 along the thermistor 11, and has the projection portions 27 projecting toward the thermistor 11 from the side wall surface 31.

The thermistor engagement portion 13 is placed in a lower end of the recessed portion 43 of the main body portion 33. For example, when the thermistor 11 is installed in the thermistor engagement portion 13, a lower surface of the thermistor 11 and the lower end of the recessed portion 43 of the main body portion 33 are placed at the substantially same positions in the vertical direction.

The thermistor fixing ribs 27 are elongated in the vertical direction and slightly project from one of the side wall surfaces 31.

In the thermistor engagement portion 13, a pair of wall portions 51 for inhibiting movement in the front and rear direction of the installed thermistor 11 is provided. By the pair of wall portions 51, the thermistor 11 is sandwiched in the front and rear direction.

Each of the terminal installment portions 41 projects to the front side from the main body portion 33 on the opposite side of the thermistor engagement portion 13.

For example, the recessed portions 43, the thermistor engagement portions 13, and the terminal installment portions 41 of the main body portion 33 are provided in two pairs, and placed at predetermined intervals in the lateral direction.

Locking projections 49 are formed on outer surfaces of the two side wall portions 47 one of which is placed on the one end side and the other one of which is placed on the other end side in the lateral direction among the side wall portions (four side wall portions) 47 of the two thermistor engagement portions 13. The locking projections 49 form the locking portions 9.

The sub-rear holder 7 is also integrally molded with insulating synthetic resin for example. In the sub-rear holder 7, two sub-rear holder recessed portions 53 are provided in accordance with the number of the thermistor engagement portions 13 and the like. The sub-rear holder recessed portions 53 pass through the sub-rear holder 7 in the front and rear direction, and are formed in a "U" shape when seen from the front and rear direction. However, the sub-rear holder recessed portions 53 are recessed upward from a lower end of the sub-rear holder 7. Thus, more strictly speaking, the sub-rear holder recessed portions are formed in a reversed "U" shape.

Since the two sub-rear holder recessed portions 53 are provided in the sub-rear holder 7, three leg portions 55 are formed in the sub-rear holder 7. Through holes 57 are provided in the two leg portions 55 placed on both sides in the lateral direction among the three leg portions 55. The through holes 57 form the locked portions 15. A part of each of the two leg portions 55 placed on both the sides in the lateral direction among the three leg portions 55 (part where the through hole 57 is provided between a pair of cutouts 56) is slightly elastically deformed to the outer side when the locked portion 15 is locked to the locking portion 9, and restored after the sub-rear holder 7 is installed in the main rear holder 5.

The projections 25 of the electric wire engagement portions 19 of the sub-rear holder 7 project slightly downward from bottom surfaces (walls of upper ends) of the "U" shape sub-rear holder recessed portions 53.

Next, assembling of the charging connector device 3 will be described.

Figure 1:
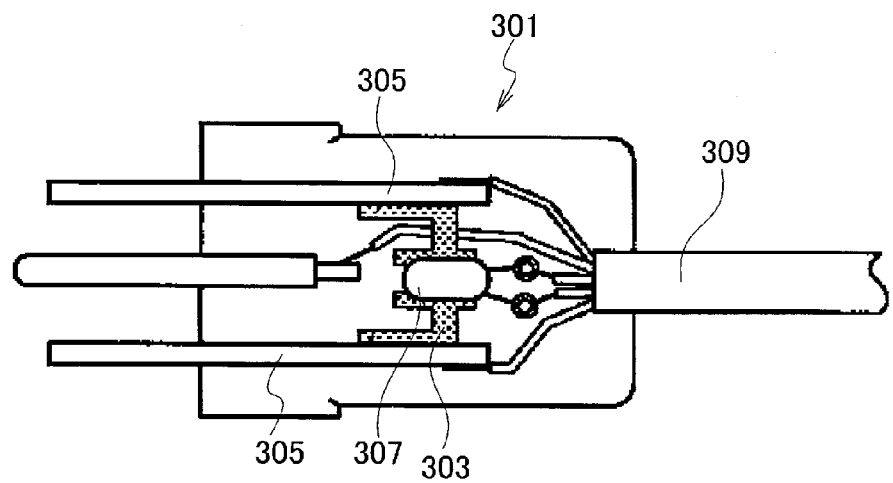
FIG. 1 is a view showing a conventional electric wire fixing structure.
Figure 2:
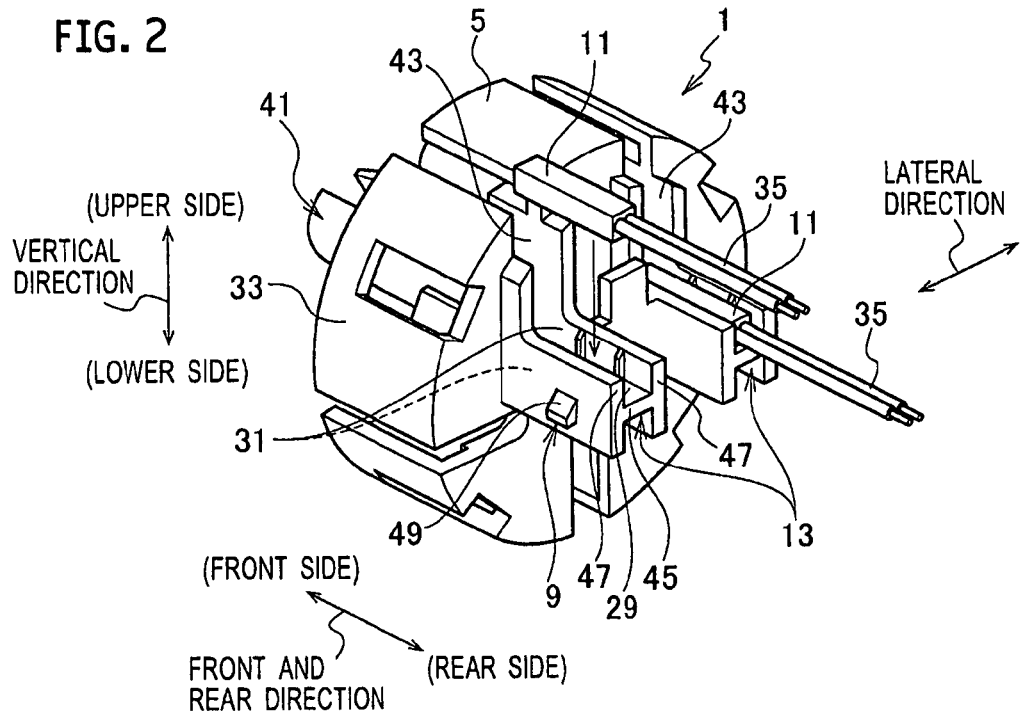
FIG. 2 is a perspective view showing a main rear holder (first holder) and thermistors of a connector according to an embodiment of the present invention (connector in which a thermistor fixing structure is adopted), the view showing a state before the thermistors are installed in the main rear holder.

Firstly, as shown in FIG. 2, the thermistors 11 are installed in the thermistor engagement portions 13 of the main rear holder 5.

Figure 3:
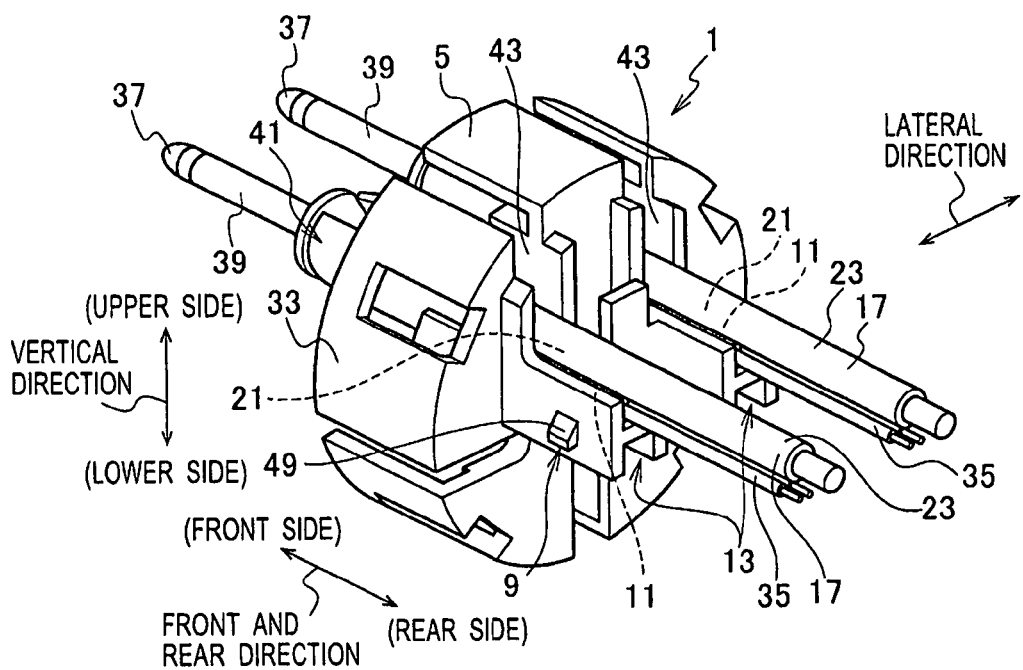
FIG. 3 is a view showing a state where the thermistors are installed and electric wires are mounted in FIG. 2.

Successively, as shown in FIG. 3, the electric wires 17 in which the terminals 39 are installed in the leading ends (front ends) are installed in the recessed portions (electric wire installment portions) 43. At this time, the terminals 39 are integrally installed in the terminal installment portions 41, and the electric wires 17 are mounted and overlapped on the thermistors 11 and brought into contact with the thermistors 11.

Figure 4:
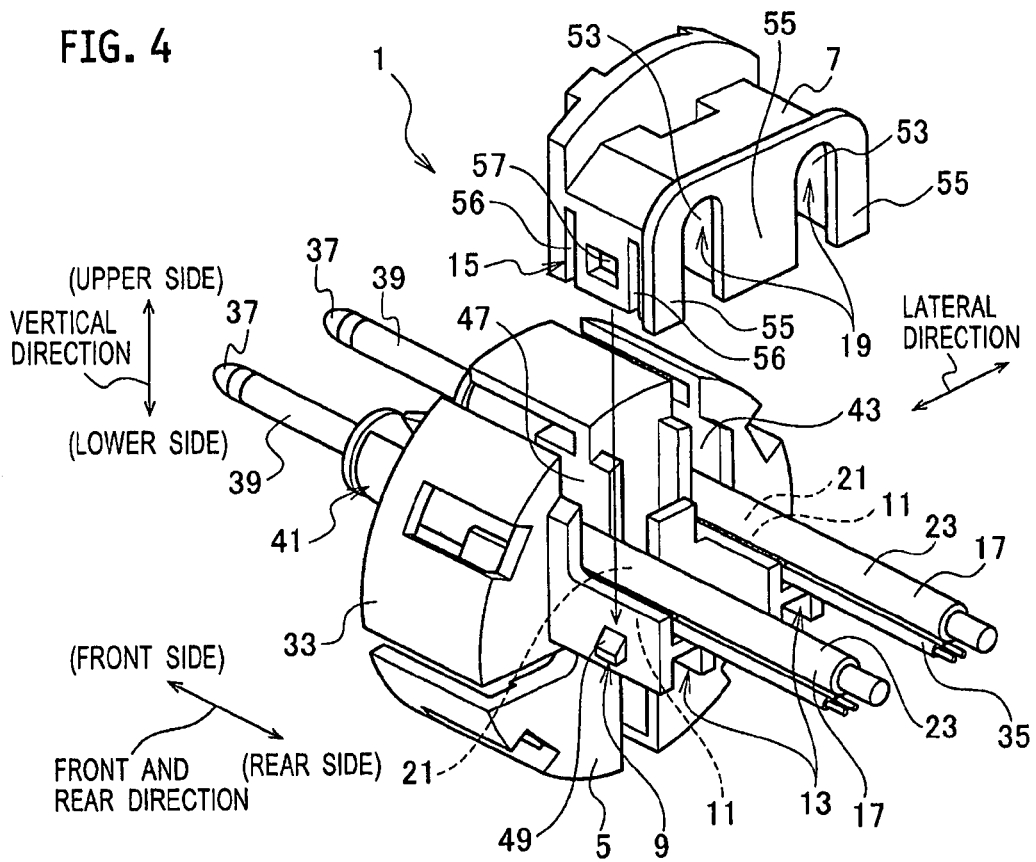
FIG. 4 is a view showing a state before a sub-rear holder (second holder) is installed in FIG. 3.
Figure 5:
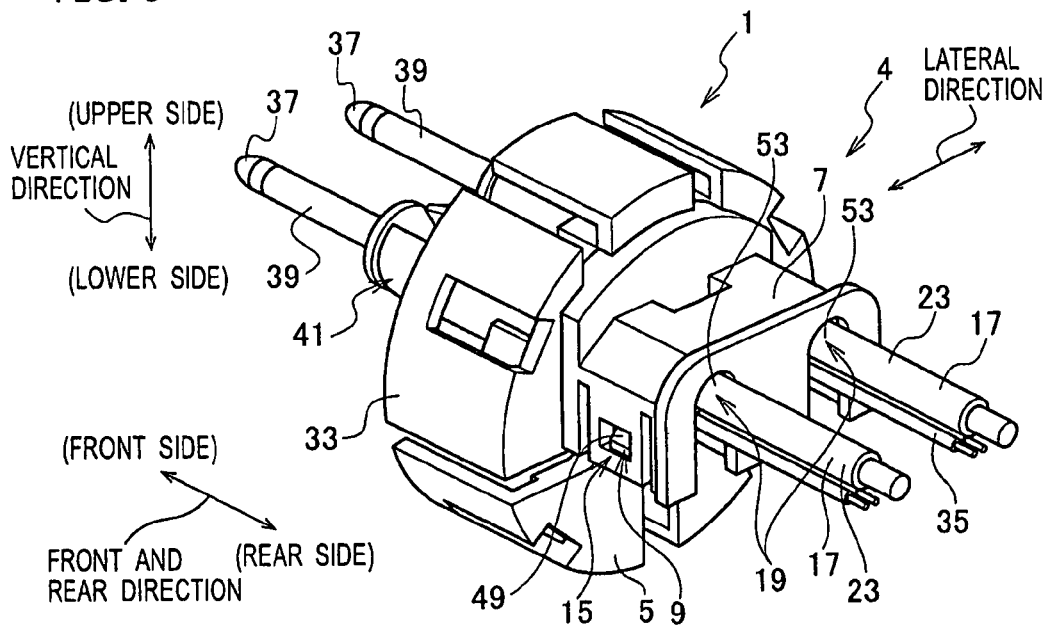
FIG. 5 is a view showing a state where the sub-rear holder is installed in FIG. 4.
Figure 6:
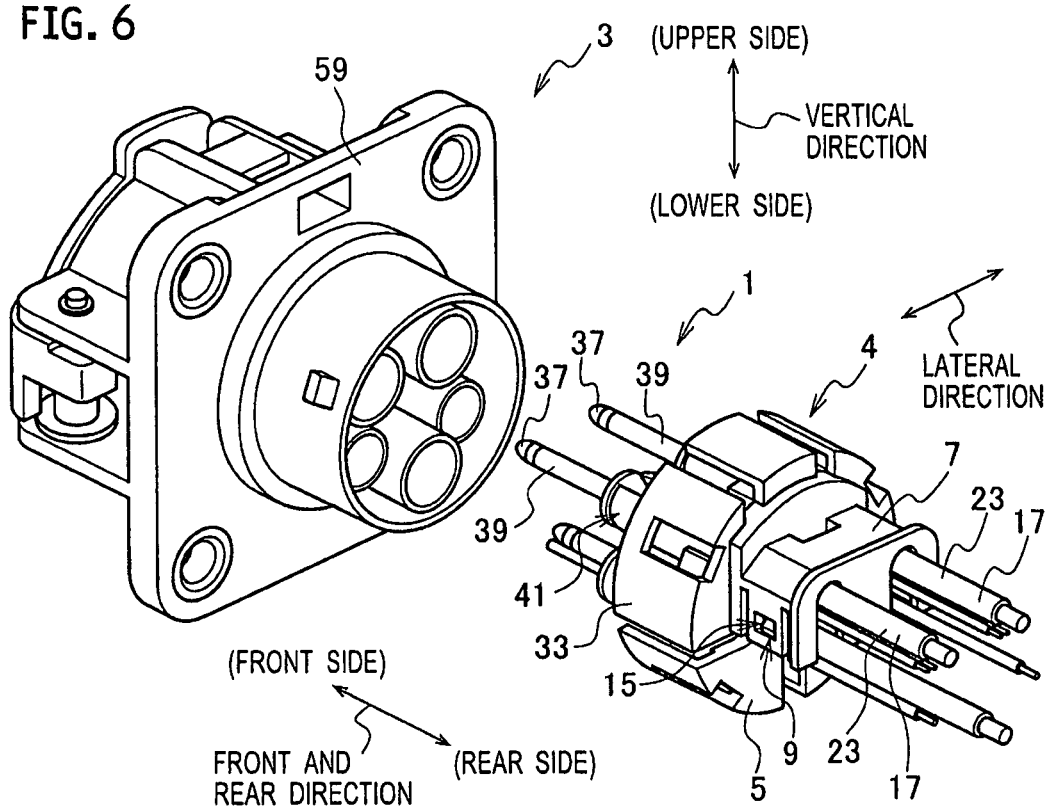
FIG. 6 is a view showing a state before the members shown in FIG. 5 are installed in a connector housing.

Successively, as shown in FIGS. 4, 5, the sub-rear holder 7 is installed in the main rear holder 5. Thereby, the thermistors 11 and the electric wires 17 are sandwiched by the main rear holder 5 and the sub-rear holder 7, and fixed to the main rear holder 5 and the sub-rear holder 7.

Successively, the main rear holder 5 in which the electric wires 17, the thermistors 11, and the sub-rear holder 7 are installed is installed in the connector housing 59.

With the connector 1, the thermistors 11 and the electric wires 17 are sandwiched and fixed by the thermistor engagement portions 13 of the main rear holder 5 and the electric wire engagement portions 19 of the sub-rear holder 7. Thus, by closely attaching and fixing the thermistors 11 and the electric wires 17, temperatures of the electric wires 17 can be easily and surely measured. By performing control of stopping electric conduction to the electric wires 17 when temperatures of the sheaths 23 of the electric wires 17 exceed a predetermined value, the electric wires 17 can be protected.

With the connector 1, fixing is made in such a manner that the contact portions 21 between the thermistors 11 and the electric wires 17 are formed in a planar shape. Thus, the temperatures of the electric wires 17 can be furthermore surely measured.

With the connector 1, without using saw-tooth shape edge portions as shown in JP 11-23379 A, the thermistors 11 and the electric wires 17 are sandwiched and fixed by the thermistor engagement portions 13 of the main rear holder 5 and the electric wire engagement portions 19 of the sub-rear holder 7 in such a manner that the contact portions 21 between the thermistors 11 and the electric wires 17 are formed in a planar shape. Thus, without strengthening and enlarging the structure, the thermistors 11 and the electric wires 17 can be closely attached and fixed.

Thereby, the temperatures of the electric wires 17 can be precisely measured. For example, overcurrent conduction can be precisely detected.

With the connector 1, the projections 25 are provided in the electric wire engagement portions 19. Thus, the electric wires 17 can be surely pressed, and the electric wires 17 and the thermistors 11 can be furthermore surely fixed to the main rear holder 5 and the sub-rear holder 7.

With the connector 1, by appropriately changing only projection height (size in the vertical direction) of the projections 25 of the electric wire engagement portions 19, electric wires 17 having various outer diameters can be fixed. Further, when various types of sub-rear holders 7 between which only projection height of projections 25 of electric wire engagement portions 19 is different is prepared in advance, the electric wires 17 having various outer diameters can be immediately fixed.

With the connector 1, the thermistor fixing ribs 27 are provided in the thermistor engagement portions 13. Thus, the thermistors 11 can be surely fixed to the main rear holder 5.

With the connector 1, by appropriately changing only projection height (size in the lateral direction) of the thermistor fixing ribs 27 of the thermistor engagement portions 13, thermistors 11 having various width size can be fixed.

When the thermistors 11 can be fixed to the main rear holder 5 by the thermistor fixing ribs 27 of the thermistor engagement portions 13, the thermistors 11 are integrated with the main rear holder 5 after installing the thermistors 11 in the main rear holder 5. Thus, installment of the electric wires 17 and installment of the sub-rear holder 7 in the main rear holder 5 after this are easily performed.

With the connector 1, the thermistor engagement portions 13 are provided to project rearward from the main body portion 33 of the main rear holder 5. Thus, by slightly changing a part of the conventional main rear holder 5, the main rear holder 5 of the present embodiment can be obtained, and a conventional die is easily re-used.

Although the embodiment of the present invention has been described heretofore, the embodiment is merely exemplified for facilitating the understanding of the present invention, and the present invention is not limited to the embodiment. The technical scope of the present invention may include not only the specific technical matters disclosed in the above-described embodiment but also various modifications, changes, and alternative techniques easily derived from the above-described specific technical matters.

What is claimed is:

1. A connector comprising:
    a connector housing; and
    a holder assembled to the connector housing, the holder supporting an electric wire connected to a terminal which is accommodated in the connector housing, wherein
    the holder includes a first holder including a locking portion and a thermistor accommodation portion which accommodates a thermistor, and a second holder including a locked portion to be locked to the locking portion and an electric wire accommodation portion which accommodates the electric wire, and
    in the holder, the thermistor and the electric wire overlapped and mounted on the thermistor are nipped between the thermistor accommodation portion and the electric wire accommodation portion by locking the locked portion to the locking portion.

2. The connector according to claim 1, wherein
    the thermistor accommodation portion includes a bottom wall on which the thermistor is mounted, and a side wall standing from the bottom wall along the thermistor, and further includes a projection portion projecting toward the thermistor from the side wall.

3. The connector according to claim 2, wherein
    the first holder includes a main body portion continuing to the thermistor accommodation portion, the main body portion in which a means to be coupled to the connector housing is provided, and further includes a recessed portion into which the electric wire is insertable in the direction along the side wall in the main body portion.

4. The connector according to any one of claims 1, wherein
    the electric wire accommodation portion includes a pressing projection to be brought into contact with the electric wire to press the electric wire when the thermistor and the electric wire are sandwiched between the electric wire accommodation portion and the thermistor accommodation portion.

* * * * *